United States Patent [19]

Ueda

[11] 3,810,216
[45] May 7, 1974

[54] DRIVING MECHANISM FOR THE MOVABLE REFLECTOR IN A SINGLE LENS REFLEX CAMERA

[75] Inventor: Hiroshi Ueda, Nara, Japan

[73] Assignee: Minotta Camera Kabushiki Kaisha, Minami-ku, Osaka-shi, Japan

[22] Filed: Dec. 12, 1972

[21] Appl. No.: 314,458

[30] Foreign Application Priority Data
Dec. 17, 1971 Japan.............................. 46-101884

[52] U.S. Cl. ............................354/156, 95/64 B
[51] Int. Cl. ............................................ G03b 19/12
[58] Field of Search .................. 95/112, 64 R, 64 B

[56] References Cited
UNITED STATES PATENTS

| | | | |
|---|---|---|---|
| 1,694,750 | 12/1928 | Morejon | 95/42 |
| 3,240,136 | 3/1966 | Fujimori | 95/42 X |
| 3,485,154 | 12/1969 | Yamada | 95/42 X |
| 3,623,410 | 11/1971 | Mita | 95/42 X |

Primary Examiner—Samuel S. Matthews
Assistant Examiner—E. M. Bero

[57] ABSTRACT

A driving mechanism for the movable reflector in a single lens reflex camera, wherein, when the movable reflector is rotated from a viewing position to a photographing position, in relation to the optical axis, the rotating torque increases proportionally to the increase of the angle of rotation, and when the movable reflector reaches the photographing position, the shutter release is positively effected. In using this mechanism, the movable reflector can be manually operated, and the image condition at the set value of the aperture can be observed in advance. The driving mechanism includes at least one closed loop-type motion system comprising two levers connected at one of their ends by a connecting link and at the other of their ends by a spring.

13 Claims, 6 Drawing Figures

3,810,216

DRIVING MECHANISM FOR THE MOVABLE REFLECTOR IN A SINGLE LENS REFLEX CAMERA

BACKGROUND OF THE INVENTION

Field of the Invention

This invention relates to a driving mechanism for a movable reflector in a single lens reflex camera.

For driving the movable reflector of a single lens reflex camera, it is a common practice to use springs as the driving force. Generally, when an object is moved by a spring, the spring force exerted thereupon is maximum at the beginning of motion and decreases to a minimum at the final stage of motion, because of the characteristic of a spring.

Therefore, it is usual in a driving system of a movable reflector for use in a single lens reflex camera that, as seen in FIG. 1, the maximum torque A is exerted upon the reflector at the starting point, i.e., the viewing position of the movable reflector, and then the torque decreases to B at the terminating point of rotation, the photographing position of the reflector.

In the single lens reflex camera, simultaneously with completion of rotation of the reflector to the photographing position, the shutter must be actuated. To this end, the release of the forward curtain of the focal plane shutter is usually effected by using the inertia of the reflector and the force of the spring, when the reflector has been rotated nearly to the photographing position. Accordingly, a sufficient force for effecting the shutter release is required, in addition to the force necessary to stabilize the reflector at the photographing position, after said reflector is shifted to said position, and the spring force at that point must be constant.

For the sake of maintaining a constant spring force at the photographing position of the reflector, the torque A at the viewing position of the reflector must be relatively large, because of the decreasing characteristic of the spring force as described. However, increase in the torque at the viewing position of the reflector results in the following disadvantages:

1. The force employed for releasing the camera to the photographing position must be unreasonably increased, as a result of which
2. the speed of rotation of the reflector excessively increases, which results in a premature shutter release, prior to completion of the operation of the preset aperture mechanism, which normally follows rotation of the reflector; and
3. the operating torque D for providing a quick return of the reflector to the viewing position must be larger than the operating torque A at the starting point where said reflector is pushed upwardly. Thus, the magnitude of the operating torque for a quick return of the reflector becomes abnormally high, resulting in an unduly harsh impact upon the camera, and the winding of the camera becomes harder because of the increased force needed for setting the shutter.

In order to eliminate these disadvantages, a driving mechanism is desired in which the operating torque for driving the movable reflector from the viewing position to the photographing position is larger at the photographing position than at the viewing position.

OBJECTS OF THE INVENTION

An object of the present invention is to provide a mechanism for a movable reflector in a single lens reflex camera which is free from those disadvantages as described, and more particularly to provide a driving mechanism for a movable reflector for use in a single lens reflex camera, wherein the rotating torque increases as the movable reflector is rotated from a stationary viewing position, where an incident ray is reflected by the reflector to a finder optical system, to a photographing position where the incident ray is caused to impinge a photographic film.

Another object of the present invention is to provide a device which, as a driving means of a single lens reflex camera, is capable of effecting a camera release with a possibly reduced force, and which ensures release of the forward curtain of a focal plane shutter, when the reflector is at the photographing position.

A further object of the present invention is to provide a device for driving a reflector by means of a loop-type motion system, wherein the operating torque at the starting point of rotation of the movable reflector, in the viewing position, is smaller than the operating torque at the photographing position which is the terminal point of rotation.

A still further object of the present invention is to provide a driving mechanism of a single lens reflex camera, wherein, for example in high-speed photographing, photographing with the aid of super-wide-angle lens, microphotographing, or a close range photographing of an animal or the like, the subject to be photographed is free from the influence of the noise of rotation of the movable reflector frame.

A still further object of the invention is to provide a driving mechanism for a movable reflector of a single lens reflex camera, wherein there is provided a device capable of manually effecting an aperture operation, irrespective of the motion of the movable reflector.

A still further object of the present invention is to provide a driving mechanism for the movable reflector, wherein a pair of loop-type motion systems are provided so as to increase the operating torque proportionally to the increase of rotating angle, and which permits a manual operation of the reflector and a manual aperture setting operation.

SUMMARY OF THE INVENTION

For attaining these objects, the present invention is characterized in that, as the driving mechanism of a movable reflector for use in a single lens reflex camera, two individually pivotally supported levers are interconnected at their one ends through a connecting link, and a tension spring is interposed between their other ends, thereby constituting a loop-type motion system which produces a rotating torque increasing in proportion to the increase of the angles of rotation of the levers, and a reflector is driven by the output of said motion system.

The present invention further pertains to a driving mechanism for the movable reflector in a single lens reflex camera, wherein in the loop-type motion system as set forth, as a coupling means for joining the connecting link to the adjacent ends of the first and second levers, one end of said connecting link is pivoted and the other end thereof is coupled by means of a slot or U-shaped end, so as to provide means for manually driving the reflector and means for effecting a manual aperture operation.

The present invention further pertains to a driving mechanism for the movable reflector frame in a single lens reflex camera, characterized in that a pair of loop-type motion systems are connected in series so as to increase the rotating torque with the progress of rotation and the movable reflector can be manually operated by a manual operation of a movable lever of one loop-type motion system, and a preset aperture device can be manually operated by actauting a movable lever of the other loop-type motion system.

According to the present invention, since the driving mechanism for a movable reflector frame of a single lens reflex camera is constituted by a loop-type motion system in which the operating torque increases proportionally to the rotation of said system, release of the camera, i.e., initiation of the reflector movement, is effected when the operating torque is minimum, while shutter release is effected without fail when the operating torque becomes maximum.

By means of this invention, rotation of the reflector to the photographing position is perfect; release of the shutter following the completion of the preset aperture operation is ensured; and the tension of the return spring for effecting a quick return of the reflector is reduced to such an extent as to avoid undesirable shocks to the camera.

In the driving mechanism for the movable reflector of a single lens reflex camera according to the present invention, by reason of a loose coupling formed by a slot or U-shaped end at a point of the loop-type motion system, the condition of an image at a preset value of aperture is readily observed, and photographing is possible in the situation where the movable reflector has been rotated, in advance, to the photographing position.

In addition, by use of a pair of loop-type motion systems as a driving mechanism for a movable reflector, the operating torques of both motion systems are added together, thereby enhancing the aforementioned advantages of the invention.

DETAILED DESCRIPTION OF THE INVENTION

Figure 1:
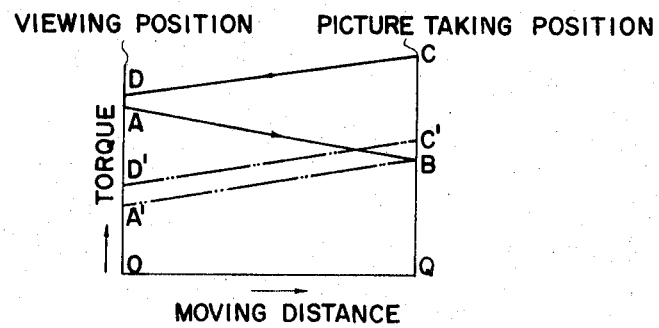
FIG. 1 is a plot showing values of torques of the conventional driving mechanism for the movable reflector operated by springs and values of torques of a loop-type motion system according to the present invention, said values being shown in relation to the angle of rotation of the movable reflector.

The present invention will be described with reference to the preferred embodiments as shown in the drawings.

Figure 2:
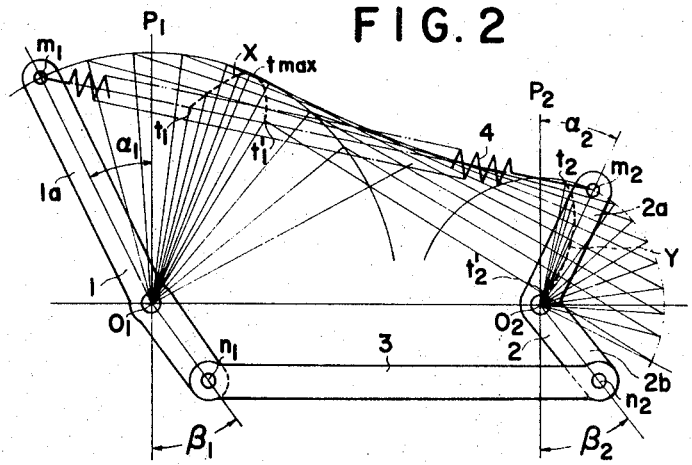
FIG. 2 is an explanatory view showing the principle of operation of a loop-type motion system according to the invention, the operating torque varying depending upon rotation of the system.

FIG. 2 shows a loop-type motion system relating to the present invention and analytically illustrates its operation. A first lever 1 is rotatably supported by a pivot $o_1$, and a second lever 2 is rotatably supported by a second pivot $o_2$. Said first and second levers 1 and 2 have arms 1a, 1b and 2a, 2b, respectively, the arms 1b and 2b each having their respective ends $n_1$, $n_2$ interconnected through a link 3 pivotally connected therewith, and the arms 1a and 2a having their other ends $m_1$ and $m_2$ interconnected through a tension coil spring 4.

With respect to the first lever 1, the length of the arm 1a connecting to the tension spring 4 is designated $m_1 o_1$, and the length of the arm 2a connected to said tension spring 4 is designated $m_2 o_2$, the length $m_1 o_1$ of the arm 1a of the first lever 1 being greater than the length $m_2 o_2$ of the arm 2a of second lever 2. The connecting link 3 is coupled to arms 1b and 2b of first and second levers 1 and 2 in such a way that the starting position of the arm 1a is biased leftwardly (in opposition to tension of the spring 4) in the drawing by the angle $\alpha 1$, from a line $o_1 p_1$ extending from the axis $o_1$ and perpendicular to a line connecting the axes $o_1$ and $o_2$, and the starting position of the arm 2a is biased rightwardly in the drawing by the angle $\alpha 2$, from a line extending from the axis $o_2$ and perpendicular to the line connecting the axes $o_1$ and $o_2$.

For simplification of description, the length $o_1 n_1$ of the arm 1b of first lever 1 and the length $o_2 n_2$ of the arm 2b of second lever 2 are assumed to be equal. The angle $p_1 o_1 n_1$ of the starting position of the arm 1b relative to said vertical axis $o_1 p_1$ is designated $\beta 1$ and the angle $p_2 o_2 n_2$ of the starting position of the arm 2b relative to said perpendicular line $o_2 p_2$ is designated $\beta 2$, $\beta 1$ and $\beta 2$ being equal.

With such arrangement, when the loop-type motion system is released from the starting position shown in FIG. 2, first and second levers 1 and 2 are simultaneously rotated through equal angles in the clockwise direction under control of the connecting link 3. In his case, for the first lever 1, the magnitude of the torque in the clockwise direction is designated by the line $o_1 t_1$ extending from $o_1$ and perpendicular to the line $m_1 m_2$, and the locus of the point t at each angle of rotation, in other words, the relation between the rotating angle and the operating torque, follows the curve indicated by the broken line x. In the course of rotation where the angle of rotation of the first lever varies within the range of 90°, the magnitude of the operating torque tends to increase between $t_1$ and $t$ max and to decrease between $t$ max and $t'_1$.

On the contrary, with respect to the second lever 2, the length $o_2 t_2$ (perpendicular to $m_1 m_2$) of the effective arm, on which the operating torque acts in the counterclockwise direction, decreases from $t_2$ to $t'_2$, as shown by the broken line Y.

Figure 3:
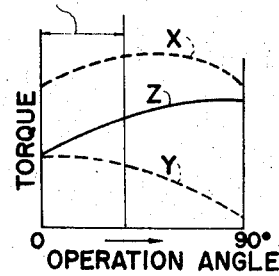
FIG. 3 is a plot showing the relation between operating torques and rotating angles of the loop-type motion system illustrated in FIG. 2.

If the operating torque, in the clockwise direction, of the first lever 1 and the operating torque, in the anticlockwise direction, of the second lever 2 are computed within the range of a rotating angle of 90°, the result is shown by the curve uniformly increasing in the clockwise direction as indicated by the solid line Z in FIG. 3. Specifically, if the operating angle is 30° or thereabouts, the operating torque increases with the degree of rotation.

The foregoing description has been made, for the sake of simplification, on the assumption that the length $o_1 n_1$ of the arm $1b$ is equal to the length $o_2 n_2$ of the arm $2b$ and $\beta 1$ is equal to $\beta 2$. But, it is noted that the above assumption is only for the sake of simplification and implies no limitation. Assuming that $o_1 n_1$ is less than $o_2 n_2$, the magnitude of the operating torque in the clockwise direction will increase as a whole, and with variation in $\beta 1$ and $\beta 2$, the rate of increase of the operating torque changes.

In the present invention, the aforementioned mechanism is applied to a driving system for a movable reflector of a single lens reflex camera. A first embodiment will now be described with reference to FIG. 4.

A first lever 11 is rotatably supported on a pivot 11a fixed to a side wall of a mirror box, and a second lever 12 is rotatably supported on another pivot 12a fixed to the side wall of the mirror box. A connecting link 13 is pivoted at one end to a pivot pin 12b on one end of second lever 12 and has a U-shaped end provided with a slot 13a, within which is loosely fitted a pivot pin 11b connected to one end of first lever 11. The other ends, respectively, of said first and second levers 11 and 12 are interconnected through a tension coil spring 14 fastened thereto. Thus, a loop-type motion system as shown in FIG. 2 is formed.

The loop-type motion system is held in starting position by a locking lever 18 engaging with a projection 11d, contiguous to the pivot pin 11c of the first lever 11, to which said spring 14 is fastened.

Figure 4:
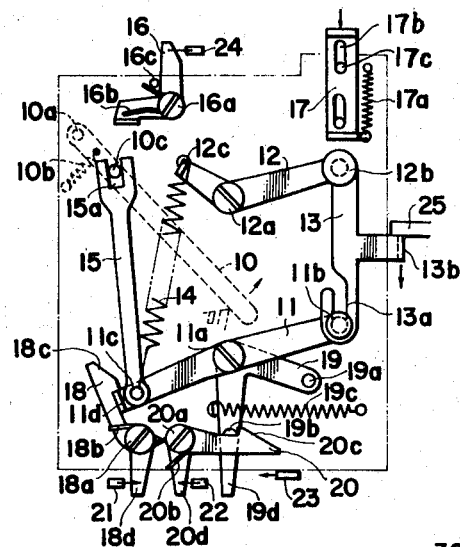
FIG. 4 is a side view showing the essential part of a preferred embodiment of this invention.

An actuating rod 15 having a forked end 15a is loosely mounted on the axle pin 11c adjacent to the projection 11d of the first lever 11. A movable reflector frame 10 is supported by an axle 10a fixed to the side wall and is urged in the clockwise direction by a spring 10b. Said forked portion 15a loosely engages a pin 10c provided on the movable reflector frame 10. FIG. 4 shows the movable reflector frame 10 in the viewing position.

The connecting link 13 is provided with a projecting portion 13b extending outwardly of the side wall of the mirror box. Abutted with said projecting portion 13b is an aperture control pin 25, associated with the lens, which is biased downwardly in the drawing. Said aperture control pin 25 follows the motion of said projection 13b to a preset value of aperture.

Above and in vertical alignment with the connecting link 13, a sliding plate 17 is vertically movably supported by the engagement of a guide slot over a guide pin 17c projecting from the side wall, said sliding plate 17 being urged upwardly by a spring 17a.

When said sliding plate 17 is moved downwardly against the force of the spring 17a to engage its lower end with the pin 12b, the second lever 12 is urged in the clockwise direction against the tension spring 14 to move the connecting link 13 downwardly, with the pin 11b of first lever 11 sliding within the slot 13a. Consequently, the aperture control pin 25, following the motion of the projecting portion 13b of connecting link 13, is also shifted downwardly. Thus, the depth of focus of the field to be photographed is learned at an earlier stage in the viewing condition of FIG. 4 when the aperture operation has been effected.

The locking lever 18 is rotatably supported on a pivot 18a fixed to the side wall and is urged in the clockwise direction by a spring 18b. Said locking lever 18 has a pawl 18c formed at the end of one arm, which pawl engages the projection 11d of said first lever 11, the other arm 18d projecting downwardly from the side wall to extend within the path of a release lever 21 moving to the right in association with the release button of the camera.

When the pawl 18c of said locking lever 18 is disengaged from the projection 11d of first lever 11 by the operation of the release lever 21, the first lever 11 is rotated in the clockwise direction by the action of the spring 14. The operating torque of said lever 11 is minimum at the starting position (the position shown in FIG. 4) and increases with the progress of rotation in the clockwise direction of said lever, as described referring to FIG. 2. Consequently, the actuating rod 15 is caused to move upwardly, with its forked portion 15a pressing upwardly, through the pin 10c, on the movable reflector frame 10, thus causing said reflector frame 10 to be rotated from the viewing position to the picture taking position. The forked portion 15a, when said reflector frame 10 nears the picture taking position, engages an auxiliary lever 16 to rotate said lever 16 in a clockwise direction against the force of a spring 16b. Said auxiliary lever 16 is pivoted on a pin 16a fixed to the side wall and is adapted to be urged in the anti-clockwise direction by the action of the spring 16b disposed around one arm thereof. In the viewing position of FIG. 4, said lever 16 is retained in the locked position by a stop 16c. The other arm of said auxiliary lever 16 projects upwardly from the side wall so as to engage a shutter release lever 24.

A return lever 19 having an inverted V-shape is supported by the pivot 11a coaxially with the first lever 11. Said return lever 19 has one arm from which a pin 19a projects, said pin 19a being caused to engage the first lever 11, when said first lever 11 is rotated in the clockwise direction by the action of the spring 14, to urge the movable reflector frame 10 to the picture-taking position, as set forth. A return spring 19c is disposed between the other arm of said return lever 19 and the side wall and attached thereto, said return spring 19c producing an operating torque larger than the clockwise rotating torque of the first and second levers. An end 19d of the said other arm of said return lever 19 projects downwardly from the side wall to extend within the path of a winding lever 23. Said other arm is further provided with a locking pin 19b of a semi-cylindrical shape.

A locking lever 20 is pivoted on a pin 20a fixed to the side wall and is urged in the counter-clockwise direction by a spring 20b. Said locking lever 20 has a pawl 20c on one arm, said pawl 20c engaging over the locking pin 19b when said return lever 19 is rotated in the clockwise direction by the winding lever 23. The other arm of said locking lever 20 projects downwardly from the side wall so as to be engaged by a release lever 22, moving in the direction of the arrow, upon completion of movement by the rear curtain of the focal plane shutter.

With such a mechanism as described, and after the shutter setting is completed by the winding lever 23, the situation as shown in FIG. 4 is presented. Under this situation, a preset value of the lens aperture is set by a known means, and the duration of exposure is either manually set or automatically controlled.

At this stage, the depth of focus at the preset value of the aperture can be observed, if desired, by pressing the sliding plate 17 downwardly against the force of the spring 17a. Consequently, the connecting link 13 is urged downwardly by said sliding plate 17, with the pin 11b of first lever 11, locked by the pawl 18c, being maintained at its locked position and with the second lever 12 alone being urged in the clockwise direction against the force of the spring 14. The aperture control pin 25, following the motion of the projection 13b of the connecting link 13, is lowered to the preset value of aperture to effect the aperture, thus the image to be photographed can be observed.

In photographing, when the pressure exerted upon the sliding plate 17 is released, the aperture is returned to full position, and the release button (not shown) of the camera is released. Consequently, the release lever 21 is shifted rightwardly in the direction of the arrow to cause the locking lever 18 to rotate in the anti-clockwise direction against the spring 18b. Accordingly, the pawl 18c of said lever 18 becomes disengaged from the projection 11d of the first lever 11 to permit the rotation of the first lever 11 in the clockwise direction by the action of the spring 14. Owing to the loop-type motion system in which the operating torque increases according to increase in the rotating angle, the actuating rod 15 urges the movable reflector frame 10 about its axis 100a in the anti-clockwise direction against the spring 10b, so as to shift said frame from the viewing position to the photographing position. Meanwhile, aperture control pin 25, following the motion of the projection 13b of the connecting link 13, moving downwardly in conjunction with the motion of said actuating rod 15, is lowered to the preset value of aperture, whereby the aperture is changed from the full position to the preset value.

When the movable reflector frame 10 nears the photographing position, the forked portion 15a of actuating rod 15 contracts the auxiliary lever 16. Said auxiliary lever 16 is urged in the clockwise direction against the force of the spring 16b, with the maximum operating torque of the loop-type motion system. Consequently, the arm of said auxiliary lever 16 presses on the shutter release lever 24, thereby actuating the shutter.

When the rear curtain of the focal plane shutter travels to the position of exposure termination, i.e., the film is entirely covered by the curtain, the release lever 22 is moved leftwardly in the direction of the arrow to urge the locking lever 20 in the clockwise direction against the spring 20b, whereupon the pawl 20c of said lever is disengaged from the locking pin 19b of return lever 19. Consequently, the return lever 19 is urged in the anti-clockwise direction by the action of the return spring 19c having an operating torque larger than the maximum operating torque of the loop-type motion system. This causes the rotation of the first lever 11 in the anti-clockwise direction, against the spring 14, through the pin 19a engaging therewith. In conjunction with the rotation of said first lever 11, the movable reflector frame 10 is urged from the photographing position to the viewing position by means of the spring 10b. When said movable reflector frame 10 comes to the end of its return motion, the projection 11d of the first lever 11 is brought into engagement with the pawl 18c of the locking lever 18. Thus, the movable reflector is returned to the position of FIG. 4, and the whole operation incidental to exposure is completed.

The winding knob (not shown) is then turned to move the winding lever 23 leftwardly (in the direction of the arrow), whereby the return lever 19 is urged in the clockwise direction against the spring 19c to engage the locking pin 19b with the pawl 20c of locking lever 20. Thus, the condition as shown in FIG. 4 is completely restored.

A second embodiment illustrated in FIGS. 5 and 6 will now be described.

In this embodiment, a pair of loop-type motion systems are provided as described referring to FIG. 2, wherein at least one lever of each motion system is loosely coupled to a connecting link, and one lever is retained in the locked position by a locking element, while the other lever is movable by a manually applied force, whereby the movable reflector frame is manually shifted to the photographing position and the preset aperture operation device is manually operated.

Figure 5:
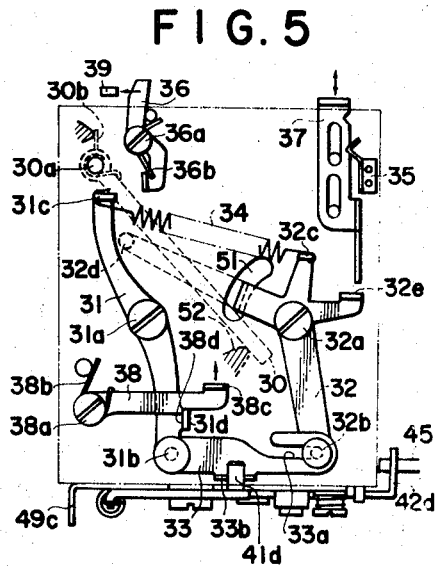
FIG. 5 is a side view showing an arrangement according to another embodiment of this invention.

FIG. 5 shows one side of a mirror box, on the side wall of which a first loop-type motion system is arranged. Two levers 31 and 32 are supported by pivots 31a and 32a, respectively. A pin 31b on one end of lever 31 is connected with one end of a connecting link 33. Said connecting link 33 has a U-shaped end provided with slot 33a, within which a pin 32b provided at one end of the other lever 32 is loosely engaged.

Disposed between and connected to the other ends 31c and 32c of levers 31 and 32 is a tension spring 34. The lever 31 has a projection 31d engageable with a stepped portion 38d of a locking lever 38, and because of the projection 31d engaging with the stepped portion 38d, rotation of the lever 31 in the clockwise direction, by the action of the spring 34, is controlled. The locking lever 38 is supported on a pivot 38a and urged in the clockwise direction by the action of a spring 38b.

A movable reflector frame 30 is rotatably supported on an axle 30a and urged in the clockwise direction by a spring 30b, said movable reflector frame 30 being normally abutted with a stop 52 so as to be maintained stationary in the viewing position. The lever 32 has an actuating arm, which extends within the mirror box through an arc-shaped groove 51 provided in the side wall, to engage the underside of movable reflector frame 30. Said lever 32 has a projecting follower arm 32e, above which a reflector operation plate 37 is vertically movably connected to the side wall and engageable by a click mechanism 35 so as to take either an upper position or a lower position.

When the locking lever 38 is disengaged from the lever 31, levers 31 and 32 are rotated in the clockwise direction, with an increasing operating torque, by the action of the spring 34. Consequently, the movable reflector frame 30 in the viewing position is urged in the anti-clockwise direction, into the photographing position, by the actuating arm of said lever 32. In conjunction with this motion, the end portion 31c of lever 31 engages with an auxiliary lever 36. Said auxiliary lever 36 is supported by a pin 36a fixed to the side wall and is urged in the clockwise direction by a spring 36b. An arm of said auxiliary lever projects from the side wall so as to be engageable with a shutter release lever 39. The auxiliary lever 36, as a result of engagement by the end portion 31c of said lever 31, is urged in the anticlockwise direction against the force of spring 36b to actuate the shutter release lever 39.

Figure 6:
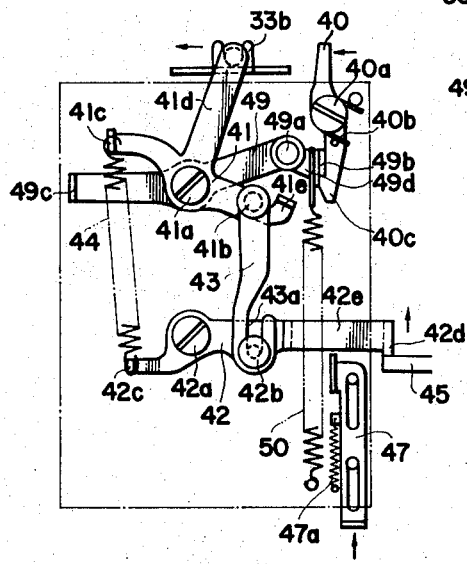
FIG. 6 is a bottom view of the arrangement of FIG. 5.

The connecting link 33 has a laterally bent portion 33b which is forked as clearly seen in FIG. 6. FIG. 6 shows the bottom face of a mirror box, on which a pair of levers 41 and 42 are pivotally supported by pins 41a and 42a. A connecting link 43 is coupled with a pin 41b connected to one end of lever 41, and has a slot 43a provided at its U-shaped other end, within which a pin 42b formed at one end of lever 42 is loosely embraced to form a slidable coupling. The lever 42 has one arm 42e extending outwardly from the bottom wall to abut with an interconnecting pin 45 on the side of the lens.

A tension spring 44 is secured between the other ends 41c and 42c of said levers 41 and 42. Thus, a second loop-type motion system is formed. A coupling arm 41d of said lever 41 projects outwardly from the bottom wall and has a tip portion fitted in the forked portion of the bent piece 33b of connecting link 33 of the first loop-type motion system. An aperture operation plate 47 is provided, adjacent the arm 42e of lever 42 bearing the pin 42b. Said aperture operation plate 47 is biased by a spring 47a to project laterally from the bottom wall and to be slidable along the bottom wall.

A return lever 49 is supported by the pin 41a which pivots said lever 41, and has one arm 49d to which a strong return spring 50 is attached, said return spring 50 urging said return lever 49 to rotate in the opposite direction (the clockwise direction) to the rotation of the lever 41 (the anti-clockwise direction) which is caused by the action of the spring 44. A bent tip portion 49b of said return lever 49 is locked against the force of return spring 50 by a pawl 40c of a locking lever 40 supported by a pivot 40a and urged in the clockwise direction by a spring 40b. Said return lever 49 is provided with a pin 49a which contacts an arm end 41e of lever 41, for facilitating the return motion of the movable reflector frame or the lever 41 to the initial position by the action of the return spring 50, after the movable reflector frame 30 is shifted to the horizontal position by the ctuating arm actuating d of lever 32 of the first loop-type motion system; in other words, from the position in which the rotation of the lever 41 in the anticlockwise direction is completed.

The other end of said locking lever 40 projects outwardly from the bottom wall to engage a lever member operating in conjunction with the closure of the rear curtain of the shutter (not shown), similarly as in the embodiment of FIG. 4. Accordingly, the locking lever 40 is urged in the counter-clockwise direction against the force of the spring 40b, thereby disengaging the pawl 40c from the bent tip portion 49b of return lever 49. The other end 49c of said return lever 49 is engageable with a lever member (not shown) operating in association with the winding operation, as in the embodiment of FIG. 4, and by the winding operation, the return lever 49 is urged in the anti-clockwise direction, against the return spring 50, into engagement with said locking lever 40, thus stressing the return spring 50.

In the embodiment shown in FIG. 5, the reflector operation plate 37 may be pressed downwardly against the click mechanism 35 by any suitable means to engage its end with the follower arm 32e of the second lever of the first loop-type motion system. Consequently, the lever 32 is urged in the clockwise direction against the spring 34, and hence, the actuating arm 32d, through rotation in the clockwise direction, urges the movable reflector frame 30 in the anti-clockwise direction, thereby rotating the reflector into the photographing position. In this case, the click mechanism serves to retain the movable reflector frame 30 at the photographing position. Accordingly, photographing can be performed as the reflector is kept in this position, and this is useful particularly where the noise of rotation of the movable reflector frame is unfavorable for taking a picture of the object to be photographed.

When said operating plate 37 is pulled upwardly, the lever 32 is urged in the anti-clockwise direction by the spring 34, whereupon the movable reflector frame 30 is rotated in the clockwise direction by the action of spring 30b into contact with the stop 52, thereby restoring it to the viewing position.

Where a preset aperture operation device is employed and observation of an image at a preset value of aperture is desired, the aperture operation plate 47 is pressed upwardly against the spring 47a to engage its end with the arm 42e of lever 42 of the second loop-type motion system. In that case, because of the U-shaped coupling of the lever 42 with the connecting link 43 formed by the pin 42b and the slot 43a, the lever 42 alone is urged in the anti-clockwise direction against the spring 44, with the first loop-type motion system remaining stationary, while the aperture interconnecting pin 45 on the side of the lens follows the motion of said lever 42.

In photographing, the locking lever 38 is caused to rotate in the direction of the arrow (the anti-clockwise direction) by any suitable means such as a release button, whereupon the projecting piece 31d of lever 31 is disengaged from the stepped portion 38d to permit the rotation of the lever 31 in the clockwise direction by the action of the spring 34. Said lever 31, at this time, is rotated together with the lever 32 with increasing operating torque. The actuating arm 32d of lever 32 urges the movable reflector frame 30 in the anti-clockwise direction toward the photographing position. In the meantime, that lever 41 of the second loop-type motion system, which has the coupling arm 41d engaging the forked portion of bent piece 33b of connecting link 33, starts rotating in the anti-clockwise direction in FIG. 6, and the operating torque increases with rotation of the lever 41 and acts on the bent piece 33b. The actuating arm 32d of the first loop-type motion system is rotated to urge the movable reflector frame 30 upwardly by the sum of the increasing operating torque of both loop-type motion systems. As the reflector frame 30 approaches nearly to the photographing position, the tip portion 31c of lever 31 of the first loop-type motion system engages the auxiliary lever 36 with the maximum operating torque to urge said auxiliary lever in the anti-clockwise direction against the force of the spring 36b, thereby actuating the shutter release lever 39.

Prior to this motion, the aperture control pin 45 on the lens side following to the end portion 42d of lever 42 of the second loop-type motion system effects an aperture operation to a preset value of aperture.

Thereafter, the exposure commences, and simultaneously with the completion of the exposure, the locking lever 40 is rotated in the anti-clockwise direction. As a consequence, the return lever 49 is unlocked to be rotated in the clockwise direction by the action of the return spring 50, until the pin 49a of the return lever 49 engages the auxiliary arm 41e of lever 41 of the second loop-type motion system. Then, the lever 41 is urged in the clockwise direction against the spring 44 to move the connecting link 33 of the first loop-type motion system rightwardly in FIG. 5 by the coupling arm 41d thereof. Because of the rightward motion of the link 33, the lever 31 and the lever 32 are urged in the anti-clockwise direction, until the bent piece 31d of lever 31 becomes engaged with the stepped portion 38d of locking lever 38. Thus, the movable reflector frame 30 is returned to the viewing position as shown with the broken line in FIG. 5. Accordingly, both the first and second loop-type motion systems are completely locked by the locking lever 38.

Then, by operating the winding lever, the return lever 49 is urged in the anti-clockwise direction against the return spring 49 to engage the end portion 59b thereof with the pawl 40c of locking lever 40, thereby locking the return lever 49. Thus, the conditions as shown in FIGS. 5 and 6 are completely restored.

I claim:

1. A single lens reflex camera including a reflecting mirror and a driving mechanism therefor, comprising:

means mounting said reflecting mirror for movement between a viewing position and a photographic position;
   a loop-type motion system including a first lever having a first arm and a second arm and pivotably supported on a first axis, a second lever having a third arm and a fourth arm and pivotably supported on a second axis, a member connecting said second and fourth arms, and a driving tension spring connected between said first and third arms; and
   actuating means for interconnecting one of the levers of said loop-type motion system with said reflecting mirror to move said mirror to said photographic position.

2. A single lens reflex camera as claimed in claim 1, wherein the length of said third arm from said second axis is shorter in comparison with the length of said first arm from said first axis.

3. A single lens reflex camera as claimed in claim 1, wherein said first and third arm diverge at an obtuse angle, and in divergent directions with respect to a perpendicular to a line connecting said first and second axes, when said reflecting mirror is positioned in a retracted viewing position.

4. A single lens reflex camera as claimed in claim 1, wherein said first arm forms an obtuse angle with a line connecting said first and second axes when said reflecting mirror is positioned in a viewing position.

5. A single lens reflex camera as claimed in claim 1, further comprising:

a locking lever engageable with said first arm, when said reflecting mirror is in the viewing position, and disengageable from said first arm in association with a releasing operation; and
   a shutter release member actuated by said loop-type motion system, when said actuating means has urged said reflecting mirror to the photographic position.

6. A single lens reflex camera as claimed in claim 1, further comprising:

a projection on said connecting member; and
   an aperture control member engaging said projection and urged to follow the motion of said projection to a preset value of aperture, said aperture control member being urged by said projection into a position for opening the aperture, when said actuating means moves said reflecting mirror to the viewing position.

7. A single lens reflex camera as claimed in claim 6 further comprising:

a pivot coupling an end of said fourth arm with said connecting member;
   a pin carried by an end of the second arm;
   a slot formed at an end of the connecting member and receiving said pin slidably; and
   a manual aperture operation plate projecting outwardly from the camera casing and engageable with said connecting member to move the same parallel said slot against the force of said driving spring.

8. A single lens reflex camera as claimed in claim 1 further comprising:

a return lever rotatably supported on the camera casing and engageable with said first lever upon rotation of the first lever within a range from a position where the reflecting mirror is in the viewing position to a position where said reflecting mirror in the photographic position;
   a return spring biasing said return lever, whereby the torque applied to said first lever by said return lever is directed in an opposite direction to the torque applied thereto by the driving spring and the magnitude of said first mentioned torque is normally larger than that of last mentioned torque; and a locking lever for arresting said return lever when the reflecting mirror is in the photographing position, and releasing said return lever upon completion of exposure.

9. A single lens reflex camera comprising:

a. a reflector member supported rotatably for movement between a viewing position and a photographing position and biased by a spring to take the viewing position;
   b. a first loop-type motion system including
      1. a first lever having a first and a second arm and rotatably supported on a first axis,
      2. a second lever rotatably supported on a second axis and having a third and a fourth arm, the length of said third arm from said second axis being shorter compared to the length of said first arm from said first axis;
      3. a first connecting member engaging said second and fourth arms, and
      4. a first driving tension spring attached between an end of said first arm and an end of said third arm;

c. a second loop-type motion system including
      1. a third lever having a fifth and a sixth arm and rotatably supported on a third axis,
      2. a fourth lever rotatably supported on a fourth axis and having a seventh and an eighth arm, the length of said seventh arm from said fourth axis being shorter in comparison with the length of said fifth arm from said third axis,
      3. a second connecting member engaging said sixth arm and said eighth arm, and 4. a second driving tension spring attached between an end of said fifth arm and an end of said seventh arm;
d. members of both loop-type motion systems causing the rotating torques of said first and second loop-type motion systems to be directed in the same direction to combine the outputs of both loop-type motion systems; and
e. actuating means for interconnecting one of the levers of said first loop-type motion system with the reflector member to move said reflector member to its photographing position, said reflector member being in its viewing position, when said first and second arms diverge at an obtuse angle and in divergent directions with respect to a perpendicular to a line connecting said first axis and said second axis and said fifth arm and said seventh arm diverge at an obtuse angle and in divergent directions with respect to a perpendicular to a line between said third axis and said fourth axis as well.

10. A single lens reflex camera as claimed in claim 9, said actuating means being provided on said second lever, wherein said first loop-type motion system includes a locking lever for arresting said first lever when the actuating means provided on said second lever contacts the reflector member in the viewing position; said first connecting member being rotatably connected to the second arm of said first lever and having a slot, a pin formed on the fourth arm of said second lever and slidably fitted within said slot; said second lever being manually rotatable against the force of the driving spring.

11. A single lens reflex camera as claimed in claim 9, wherein said first loop-type motion system includes a locking lever for arresting said first lever when the reflector member is in the viewing position; said connecting member of said second loop-type motion system being rotatably connected to the sixth arm of said third lever and having a slot, a pin formed on the eighth arm of said fourth lever and slidably fitted within said slot; an aperture control member engaging with said fourth arm; and including means for manually rotating said fourth arm against the force of said second driving spring.

12. A single lens reflex camera as claimed in claim 9, including a shutter release member actuated by said first loop-type motion system when the actuating means moves the reflector to the photographing position.

13. A single lens reflex camera as claimed in claim 9, further comprising:
a return lever engageable with the third lever of said second loop-type motion system;
a return spring biasing said return lever to rotate said return lever against the sum of outputs of said first and second loop-type motion systems; and
a locking member for arresting said return lever and releasing the same upon the completion of an exposure.

* * * * *

UNITED STATES PATENT OFFICE
CERTIFICATE OF CORRECTION

Patent No. 3,810,216           Dated May 7, 1974

Inventor(s) Hiroshi Ueda

It is certified that error appears in the above-identified patent and that said Letters Patent are hereby corrected as shown below:

[73]    Assignee: Minolta Camera Kabushiki Kaisha,

Minami-ku, Osaka-shi, Japan

Signed and sealed this 8th day of October 1974.

(SEAL)
Attest:

McCOY M. GIBSON JR.            C. MARSHALL DANN
Attesting Officer                Commissioner of Patents